(12) United States Patent
Brady et al.

(10) Patent No.: US 6,899,317 B2
(45) Date of Patent: May 31, 2005

(54) COMBINED TEST AND BLEED VALVE FITTING

(75) Inventors: Richard D. Brady, Bethesda, MD (US); Jeffrey Vaught, Mt. Airy, MD (US)

(73) Assignee: P.T.V. Enterprises, LLC, Jessup, MD (US)

( * ) Notice: Subject to any disclaimer, the term of this patent is extended or adjusted under 35 U.S.C. 154(b) by 90 days.

(21) Appl. No.: 10/655,067

(22) Filed: Sep. 5, 2003

(65) Prior Publication Data

US 2005/0051751 A1    Mar. 10, 2005

(51) Int. Cl.[7] .............................................. F16K 31/50
(52) U.S. Cl. ...................... 251/264; 251/325; 137/557; 73/756; 73/866.5
(58) Field of Search ................ 257/264, 345; 137/557; 73/756, 866.5

(56) References Cited

U.S. PATENT DOCUMENTS

| | | | |
|---|---|---|---|
| 3,356,335 A * | 12/1967 | Koch et al. .................. 251/264 |
| 4,297,891 A | 11/1981 | Falcon | |
| 4,926,704 A | 5/1990 | Survil et al. | |
| 5,192,425 A | 3/1993 | Cyphers et al. | |
| 5,515,885 A | 5/1996 | Lanasa | |
| 5,687,949 A * | 11/1997 | Dukas et al. ................ 251/264 |
| 5,894,093 A | 4/1999 | Ferguson et al. | |
| 5,911,163 A | 6/1999 | Ferguson | |
| 5,992,440 A * | 11/1999 | Betz ........................... 251/264 |
| 6,164,139 A | 12/2000 | Krimmer | |
| 6,171,287 B1 * | 1/2001 | Lynn et al. .................. 251/149 |
| 6,199,432 B1 | 3/2001 | Dunn | |
| 6,223,766 B1 * | 5/2001 | Shaw et al. .................. 137/557 |
| 6,330,890 B1 | 12/2001 | Ekman | |
| 6,745,634 B2 * | 6/2004 | Beck et al. .................... 73/756 |

* cited by examiner

*Primary Examiner*—John Bastianelli
(74) *Attorney, Agent, or Firm*—Gregory J. Gore

(57) ABSTRACT

A test port and bleed valve is combined in a unitary main body of a device. A split core test plug is positioned within a hollow valve stem. The seal at the bottom of the valve stem engages a valve seat to provide a releasable airtight seal. At the top of the valve stem, rotating the stem so that it axially moves toward and away from the valve seat to open and close the valve to bleed gas from the vessel or piping system. A bleed port is located through the sidewall of the main body of the device so that it is in fluid communication with the working medium of the vessel or piping. The top of the stem includes a removable cap and retainer to cover an aperture in the top of the stem through which a test probe can be inserted.

6 Claims, 3 Drawing Sheets

COMBINED TEST AND BLEED VALVE FITTING

FIELD OF THE INVENTION

This invention relates to a test plug for pressurized piping which requires a gas such as air to be bled from the system prior to introducing a test probe into the plug. More specifically, it relates to a valve body having both a test probe valve and a gas bleed valve combined in a single device.

BACKGROUND OF THE INVENTION

Different types of plugs and fittings are well known in the art of pressurized vessels and plumbing piping systems such as those used for heating and cooling. Some of these plumbing fittings include valves which are capable of receiving a test probe so that the temperature or pressure within piping or a vessel may be measured. One particular type of device is a valve test plug which includes a valve core of resilient material with an axial seam which receives a measurement probe while maintaining the pressure seal between the interior of the piping of the vessel and the outside environment. An example of such a test plug is disclosed in U.S. Pat. No. 4,926,704 issued to Survil et al.

It is often a requirement of pressurized systems which contain a liquid operating medium that trapped gases such as air be expelled from the system to maintain its normal operation. It is common practice to install air vents at the high points of piping systems and at the top of risers for venting during system filling. Manual air vents should have a non-removable valve stem to prevent accidental removal of the stem under pressure and the top of the stem should be knurled or have a slot for hand or screwdriver operation only. Also, manual air vents should be installed at the high point of the piping system at the top of risers and at all coils.

Furthermore, it is often required to bleed the trapped air or gas prior to taking temperature and pressure measurements. To accomplish this, systems often include a gas bleed valve body which is properly located where trapped air or gas accumulates. Such bleed valves are well known in the art and are used in systems which also include the above-described valve test plug. A problem exists, however, in that the use of separate valve bodies for each of the test and bleed devices adds expense and complexity to a pressurized system such as heating and cooling piping. Furthermore, there are situations in which space is very limited and the manifolds required to support the separate valve bodies which are most often joined by threaded connection to the manifolds occupy too much space in areas of limited access. There is therefore a need for an economical and compact device which provides the combined functionality of a test plug and a gas bleed valve.

SUMMARY OF THE INVENTION

In order to fulfill the above-described need in the art, the present combined test plug and gas bleed valve has been devised. A main body of the device is vertically oriented and threadably engaged to a manifold or other suitable fitting so that the end of an axial bore through the main body is exposed to the working medium of the vessel or piping to which it is attached. The device further includes the elastomeric split core of the prior art test plug that is positioned within a hollow valve stem which is axially movable between open and closed positions within the main body of the structure. The stem is threadably engaged in the main body and abuts a valve seat in the main body when in its closed position. A seal at the bottom end of the stem engages the valve seat to provide a releasable air-tight seal. At the top end of the stem, means are provided for rotating the stem so that it axially moves toward and away from the valve seat to open and close the valve to bleed the gas from the vessel or system. A bleed port is located through the sidewall of the main body of the fitting so that it is in fluid communication with the working medium of the vessel or piping when the valve is in its open position. The top of the stem includes a removable cap and retainer to cover an aperture in the top of the stem through which the test probe can be inserted.

Therefore, according to the invention, the dual functions of test probe access and gas bleeding is provided in a single fitting. Operation of both the valve stem and access through the top of the stem are provided at one end of the fitting at its top end in a vertically-extending fitting. This provides easy access for the maintenance person, especially in confined areas where working space is limited. Other objects and advantages will be apparent from the following drawings and description of the preferred embodiment.

DESCRIPTION OF THE PREFERRED EMBODIMENT

Figure 1:
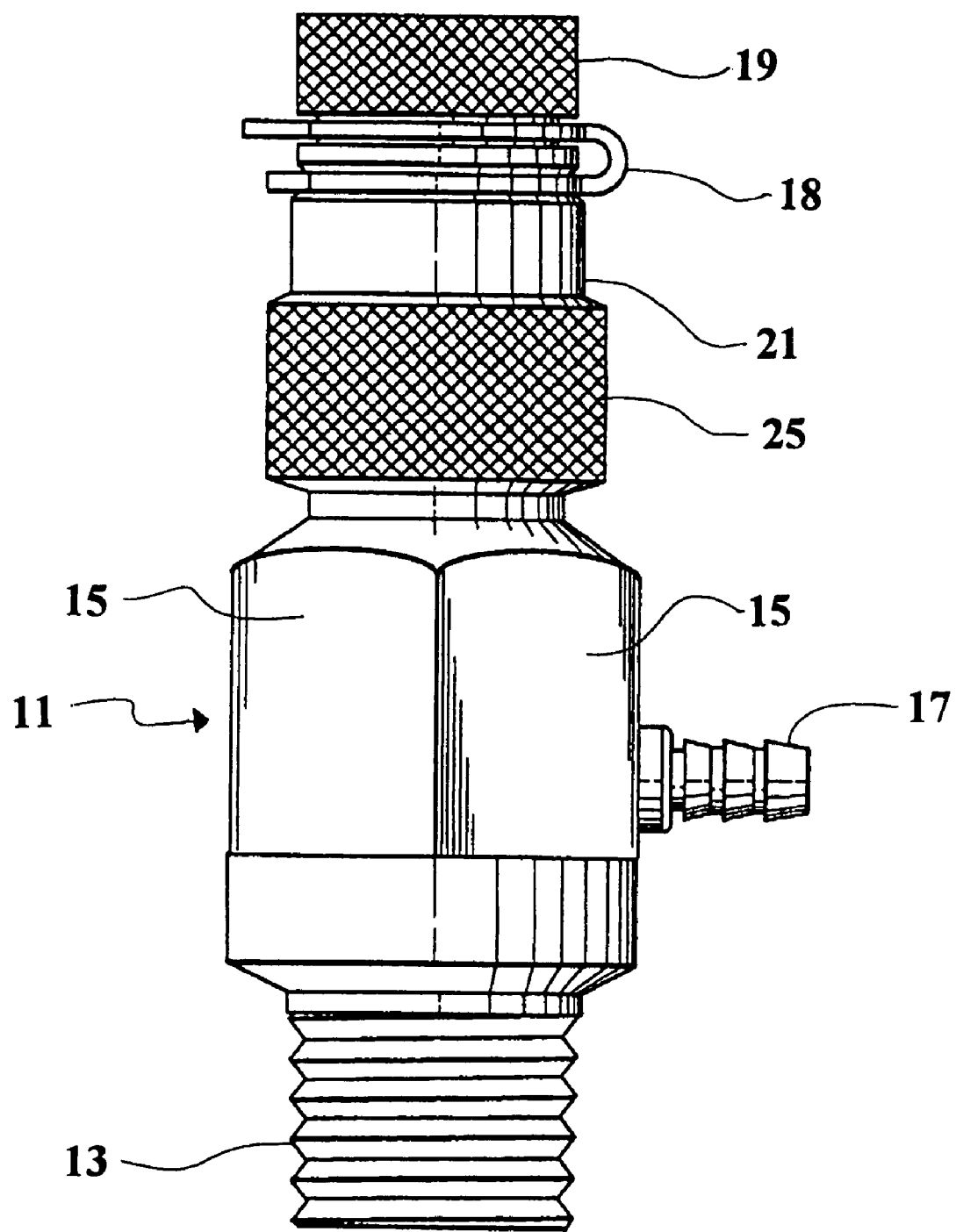
FIG. 1 is a front view of the present invention.

Referring now to FIG. 1, the external features of the present invention are shown. The main body 11, which should be installed vertically, includes an externally threaded portion 13 at its bottom end for attachment to a mounting manifold or boss of a vessel or piping (not shown) which contains a pressurized fluid. The main body preferably includes wrenchable flats 15 so that it may be turned by a tool when it is threaded into its mounting structure. The main body further includes a gas bleed port pipe 17 extending from the sidewall. Mounted to the top of the main body is a rotatable valve stem 21 that has a hollow axial bore covered by threadably attached cap 19 at its top which remains attached by tether 18 when it is unscrewed. Turning of the stem is facilitated by knurl 25 so that the stem may be easily turned by hand.

Figure 2:
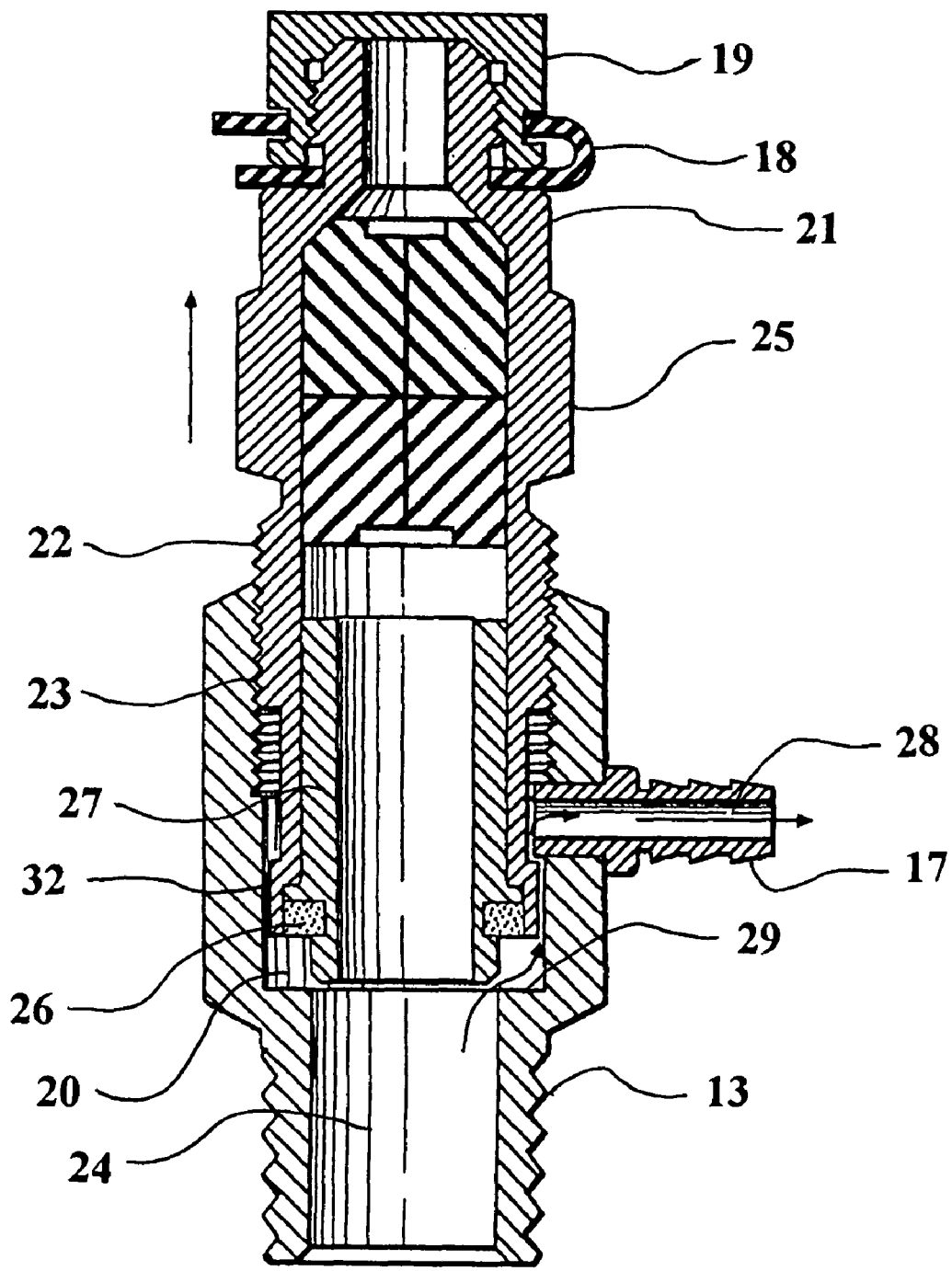
FIG. 2 is a front sectional view showing the gas bleed valve in its open position.

Referring now to FIG. 2, a cross section view of the device is shown which depicts greater detail of its internal structure and the relationship of its various parts. The valve stem 21 includes external threads 22 which mate with internal threads 23 in the bore of the main body so that it moves upward axially within the main body when the stem is turned as shown by the arrow in this figure. At the bottom of the stem a valve seal 27 includes an elastomeric ring 26 which operates against valve seat 29 of the main body. As shown in this figure, the valve seat 29 of the main body is an annular ring formed at the junction between a first lower cylindrical bore 24 and a second upper cylindrical bore 20 of greater diameter. Here, the stem is shown in its retracted position so that gas entering the base of the main body can escape past the valve seat and out of the bleed port 28 as indicated by the arrows. The stem further includes a collar 32 at the bottom having an upward-facing annular surface. It will be understood that the lower cylindrical bore 24 is in fluid communication with a piping system to which the main body is attached by threaded connection provided by threads 13. The bleed port includes a short pipe 17 which is suitable for attachment of a flexible hose (not shown) which can direct any expelled gases or fluids away from the area around the device. The pipe 17 extends into the bore of the main body and abuts the annular face of collar 32 when the valve stem is in its fully retracted position. These structures provide a stop to prevent the valve stem from being completely unscrewed from the main body accidentally, thus preventing a blow-out.

Figure 3:
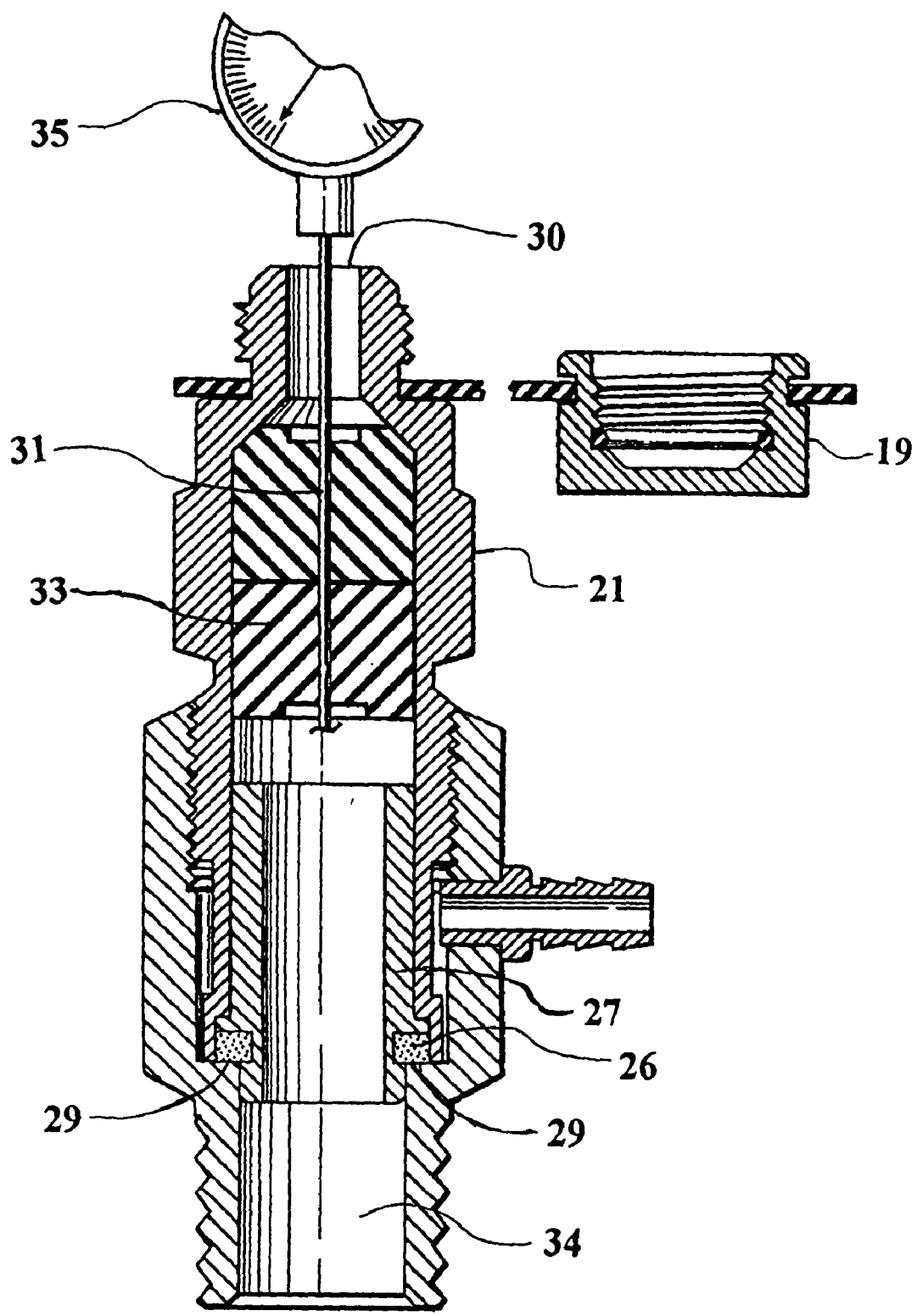
FIG. 3 is a front sectional view showing the gas bleed valve in its closed position with a test probe inserted.

Referring now to FIG. 3, the gas bleed valve is shown in its closed position, the seal 27 of the stem 21 having been turned down against the valve seat 29 of the main body. In this embodiment, the seal 27 includes a sleeve that is fitted into the bore of the bottom of stem 21, the operative element of the seal being an elastomeric ring 26 which is fitted into a groove in the outside of the sleeve. With the valve in its closed position, the elastomeric ring is firmly interposed between the valve stem and the valve seat. To maintain the alignment of parts, a portion of the sleeve at the bottom extends into bore 34 of the main body. As shown in this figure, the cap 19 has been removed exposing an access port 30 open to the interior of the stem at the top which receives the test probe 31. The valve stem 21 has an axial bore throughout which includes a tightly-fitted split resilient core 33 suitable for sealingly receiving the probe of a pressure/temperature test instrument 35. The construction of the core and its material is similar to that disclosed in the aforementioned U.S. Pat. No. 4,926,704 and utilized in a product sold under the name of SuperSeal sold by Flow Design, Inc. After measurements are taken, the cap is replaced. The next time measurements are to be taken, the valve stem is again turned to open the valve as shown in FIG. 2 to once again first bleed any trapped gas present in the system.

By the above-described description of the preferred embodiment, the objects of the invention to provide the functions of a manual air vent and a pressure/temperature test port in a single, compact, vertically-mounted fitting have been achieved. Other adaptations and modifications of the present invention will be understood by those of skill in the art without departing from the scope and spirit of the invention which is to be determined only by the following claims and their legal equivalents.

What is claimed is:

1. A test plug and gas bleed fitting, comprising:
   a main body having first and second coaxial bores, the first bore being of lesser diameter and extending downwardly for fluid communication with a vessel or piping to which the main body is affixed;
   the second bore of larger diameter extending upwardly through a top end of the main body and including an annular valve seat at its base where it meets the first bore, said second bore including a threaded region adjacent the top end thereof;
   a hollow valve stem having an externally threaded region engaging said threaded region of said main body second bore whereby turning said valve stem about its axis moves said valve stem axially within said second bore of said main body between open and closed positions, said valve stem further including a seal at a bottom end, an axial bore throughout and an access port through a top end thereof;
   a resilient split core tightly fitted within said valve stem bore for sealingly receiving a test probe inserted therethrough;
   a valve stem seal located adjacent the bottom end of the valve stem, said seal abutting said valve seat of said main body when said valve stem is rotated to a closed position; and
   a gas bleed port located through a sidewall of said main body and being in fluid communication with said first bore of said main body only when said valve stem is in the open position.

2. The fitting of claim 1 wherein said main body further includes an externally-threaded portion at the bottom end.

3. The fitting of claim 2 wherein exterior sidewalls of the main body include wrenchable flats for receiving a tool to axially rotate the main body.

4. The fitting of claim 3 further including a tether connecting the cap to the top of the main body.

5. The fitting of claim 4 wherein said valve stem seal includes a sleeve mounted into the base of the valve stem, said sleeve including an elastomeric ring which lies firmly between the end of the valve stem and the valve seat when the valve stem is in the closed position.

6. The fitting of claim 5 wherein said valve stem further includes a collar at the bottom having an upward-facing annular surface that provides a stop against a bleed port pipe that extends through said sidewall and into said second bore of said main body.

\* \* \* \* \*